United States Patent
Lee et al.

(10) Patent No.: US 6,848,963 B2
(45) Date of Patent: Feb. 1, 2005

(54) METHOD FOR CLEANING BONDING CHAMBER OF BONDING MACHINE

(75) Inventors: Sang Seok Lee, Taegu-kwangyokshi (KR); Sang Ho Park, Pusan-kwangyokshi (KR)

(73) Assignee: LG. Philips LCD Co., Ltd., Seoul (KR)

(*) Notice: Subject to any disclaimer, the term of this patent is extended or adjusted under 35 U.S.C. 154(b) by 286 days.

(21) Appl. No.: 10/268,706

(22) Filed: Oct. 11, 2002

(65) Prior Publication Data

US 2003/0181123 A1 Sep. 25, 2003

(30) Foreign Application Priority Data

Mar. 20, 2002 (KR) .................................. 2002-0015080

(51) Int. Cl.⁷ .............................. H01J 9/00; G02F 1/13
(52) U.S. Cl. ......................... 445/24; 349/189; 349/190
(58) Field of Search .................... 445/24, 25; 349/189, 349/190

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,539,545 A | 7/1996 | Shimizu et al. | |
| 5,548,429 A | 8/1996 | Tsujita | |
| 5,680,189 A | 10/1997 | Shimizu et al. | |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,678 A | 9/1999 | Ashida | |
| 5,956,112 A | 9/1999 | Fujimori et al. | |
| 6,001,203 A | 12/1999 | Yamada et al. | |
| 6,016,181 A | 1/2000 | Shimada | |
| 6,219,126 B1 | 4/2001 | von Gutfeld | |
| 6,236,445 B1 | 5/2001 | Foschaar et al. | |
| 6,304,311 B1 | 10/2001 | Egami et al. | |
| 6,337,730 B1 | 1/2002 | Ozaki et al. | |
| 6,784,970 B2 * | 8/2004 | Lee et al. ................... | 349/189 |
| 2001/0021000 A1 | 9/2001 | Egami | |

FOREIGN PATENT DOCUMENTS

| | | |
|---|---|---|
| EP | 1003066 | 5/2000 |
| JP | 51-065656 | 7/1976 |
| JP | 57038414 | 3/1982 |
| JP | 57088428 | 6/1982 |
| JP | 58027126 | 2/1983 |
| JP | 59-057221 | 4/1984 |
| JP | 59-195222 | 11/1984 |
| JP | 60-111221 | 6/1985 |
| JP | 60164723 | 8/1985 |
| JP | 60217343 | 10/1985 |
| JP | 61007822 | 1/1986 |
| JP | 61055625 | 3/1986 |
| JP | 62089025 | 4/1987 |
| JP | 62090622 | 4/1987 |
| JP | 62205319 | 9/1987 |

(List continued on next page.)

*Primary Examiner*—Joseph Williams
(74) *Attorney, Agent, or Firm*—McKenna Long & Aldridge LLP (57) ABSTRACT

A method of cleaning a liquid crystal display bonding chamber includes loading a first substrate and a second substrate in the bonding chamber, bonding the first substrate and the second substrate to produce bonded substrates, unloading the bonded substrates, repeating the loading, the bonding and the unloading for K times, where K is an integer greater than zero, and cleaning the bonding chamber.

31 Claims, 5 Drawing Sheets

FOREIGN PATENT DOCUMENTS

| | | |
|---|---|---|
| JP | 63109413 | 5/1988 |
| JP | 63110425 | 5/1988 |
| JP | 63128315 | 5/1988 |
| JP | 63311233 | 12/1988 |
| JP | 05127179 | 5/1993 |
| JP | 05-154923 | 6/1993 |
| JP | 05265011 | 10/1993 |
| JP | 05281557 | 10/1993 |
| JP | 05281562 | 10/1993 |
| JP | 06051256 | 2/1994 |
| JP | 06148657 | 5/1994 |
| JP | 6160871 | 6/1994 |
| JP | 06-235925 | 8/1994 |
| JP | 06265915 | 9/1994 |
| JP | 06-313870 | 11/1994 |
| JP | 07-084268 | 3/1995 |
| JP | 07128674 | 5/1995 |
| JP | 07181507 | 7/1995 |
| JP | 08095066 | 4/1996 |
| JP | 08-101395 | 4/1996 |
| JP | 081006101 | 4/1996 |
| JP | 08171094 | 7/1996 |
| JP | 08190099 | 7/1996 |
| JP | 08240807 | 9/1996 |
| JP | 09005762 | 1/1997 |
| JP | 09026578 | 1/1997 |
| JP | 09-061829 | 3/1997 |
| JP | 09073075 | 3/1997 |
| JP | 09073096 | 3/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10-177178 | 6/1998 |
| JP | 10221700 | 8/1998 |
| JP | 10282512 | 10/1998 |
| JP | 10-333157 | 12/1998 |
| JP | 10-333159 | 12/1998 |
| JP | 11014953 | 1/1999 |
| JP | 11038424 | 2/1999 |
| JP | 11064811 | 3/1999 |
| JP | 11109388 | 4/1999 |
| JP | 11-133438 | 5/1999 |
| JP | 11-142864 | 5/1999 |
| JP | 11174477 | 7/1999 |
| JP | 11212045 | 8/1999 |
| JP | 11-248930 | 9/1999 |
| JP | 11-326922 | 11/1999 |
| JP | 11344714 | 12/1999 |
| JP | 2000-002879 | 1/2000 |
| JP | 2000029035 | 1/2000 |
| JP | 2000-056311 | 2/2000 |
| JP | 2000-066165 | 3/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001117105 | 4/2001 |
| JP | 2001-117109 | 4/2001 |
| JP | 2001-133745 | 5/2001 |
| JP | 2001133794 | 5/2001 |
| JP | 2001-133799 | 5/2001 |
| JP | 2001142074 | 5/2001 |
| JP | 2001147437 | 5/2001 |
| JP | 2001154211 | 6/2001 |
| JP | 2001-166272 | 6/2001 |
| JP | 2001-166310 | 6/2001 |
| JP | 2001-183683 | 7/2001 |
| JP | 2001-209052 | 8/2001 |
| JP | 2001-209060 | 8/2001 |
| JP | 2001-222017 | 8/2001 |
| JP | 2001-235758 | 8/2001 |
| JP | 2001-215459 | 9/2001 |
| JP | 2001255542 | 9/2001 |
| JP | 2001264782 | 9/2001 |
| JP | 2001-201750 | 10/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001330840 | 11/2001 |
| JP | 2001-356353 | 12/2001 |
| JP | 2001356354 | 12/2001 |
| JP | 2002014360 | 1/2002 |
| JP | 2002023176 | 1/2002 |
| JP | 2002049045 | 2/2002 |
| JP | 2002082340 | 3/2002 |
| JP | 2002090759 | 3/2002 |
| JP | 2002090760 | 3/2002 |
| JP | 2002107740 | 4/2002 |
| JP | 2002122872 | 4/2002 |
| JP | 2002122873 | 4/2002 |
| JP | 2002080321 | 6/2002 |
| JP | 2002202512 | 7/2002 |
| JP | 2002202514 | 7/2002 |
| JP | 2002214626 | 7/2002 |
| KR | 2000-035302 A1 | 6/2000 |

* cited by examiner

METHOD FOR CLEANING BONDING CHAMBER OF BONDING MACHINE

This application claims the benefit of Korean Patent Application No. P2002-0015080 filed on Mar. 20, 2002, which is hereby incorporated by reference for all purposes as if fully set forth herein.

This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME" as if fully set forth herein.

BACKGROUND OF THE INVENTION

1. Field of the Invention

The present invention relates to a bonding machine for fabricating a liquid crystal display (LCD), and more particularly, to a method for cleaning a bonding chamber of a bonding machine for fabricating a liquid crystal display.

2. Discussion of the Related Art

In general, recent developments in the information communication field have increased demand for various types of displays devices. In response to this demand, various flat panel type displays such as liquid crystal display (LCD), plasma display panel (PDP), electro-luminescent display (ELD), and vacuum fluorescent display (VFD) have been developed. These are used as displays for various equipments.

In particular, LCD devices have been used because of their high resolution, lightweight, thin profile, and low power consumption. In addition, LCD devices have been implemented in mobile devices such as monitors for notebook computers. Furthermore, LCD devices have been developed for monitors of computer and television to receive and display image signals.

Efforts to improve the image quality of LCD devices contrast with the benefits of high resolution, lightweight, thin profile, and low power consumption. In order to incorporate LCD devices as a general image display, image quality such as fineness, brightness and large display area, for example, must be realized.

LCD devices are provided with an LCD panel for displaying images and a driving unit for applying driving signals to the LCD panel. The LCD panel is provided with first and second glass substrates bonded with a certain cell gap with liquid crystal material injected therebetween.

The process of manufacturing an LCD device in a related art includes forming a sealant pattern on one of the first and second substrates to form an injection inlet, bonding the first and second substrates to each other within a vacuum processing chamber, and injecting liquid crystal material through the injection inlet. In another process of manufacturing an LCD device according to the related art, a liquid crystal dropping method, which is disclosed in Japanese Patent Application No. 11-089612 and 11-172903, includes dropping liquid crystal material on a first substrate, arranging a second substrate over the first substrate, and moving the first and second substrates to be adjacent to each other, and bonding the first and second substrates to each other.

Compared to the liquid crystal injection method, the liquid crystal dropping method is advantageous in that various processes such as, formation of a liquid crystal material injection inlet, injection of the liquid crystal material, and sealing of the injection inlet, are unnecessary since the liquid crystal material is predisposed on the first substrate. To this end, a variety of apparatuses for applying the liquid crystal dropping method have been recently researched.

Figure 1:
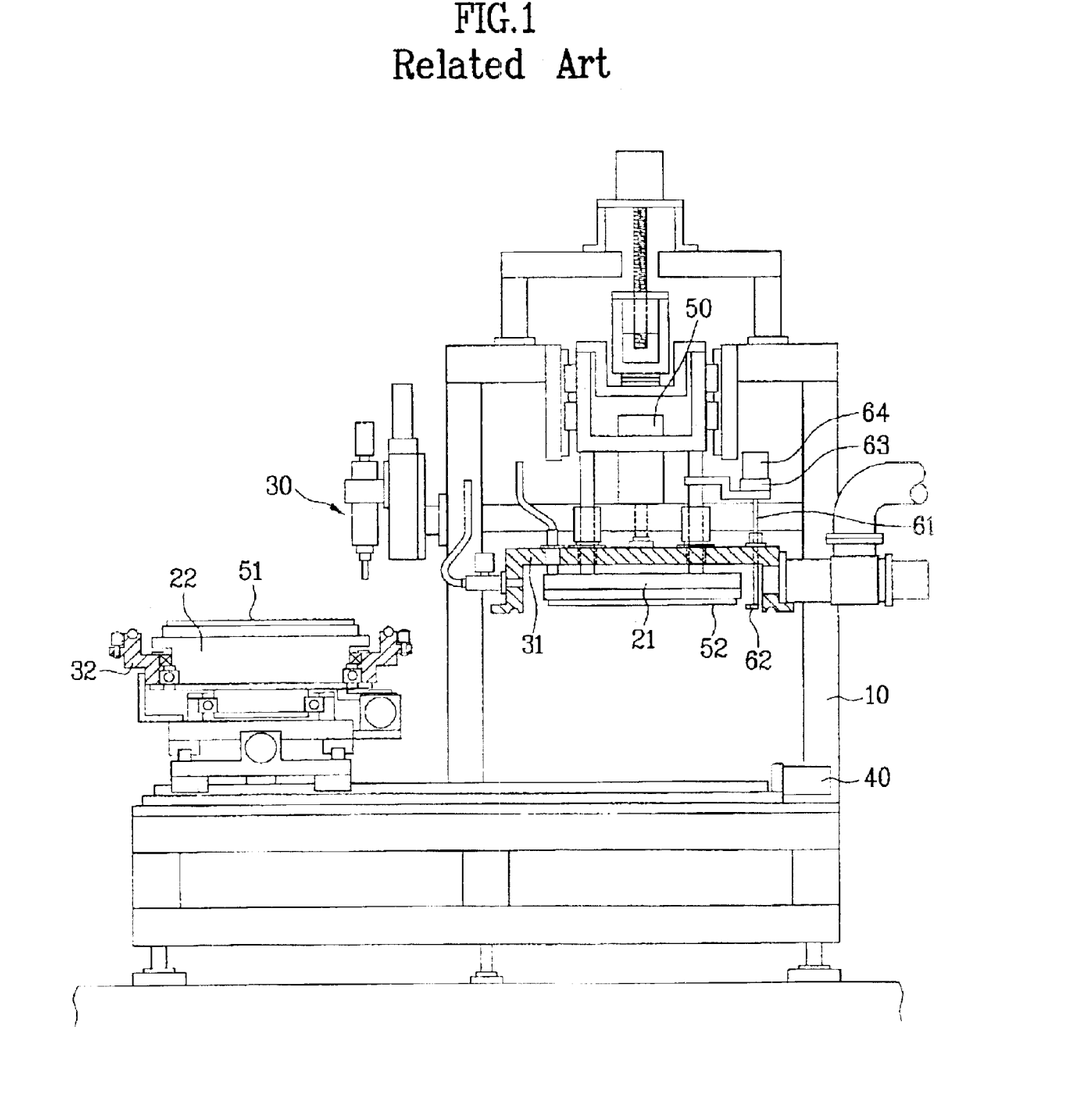
FIG. 1 is a schematic diagram illustrating a substrate assembly device based on a liquid crystal dropping type of the related art at the liquid crystal dropping stage.
Figure 2:
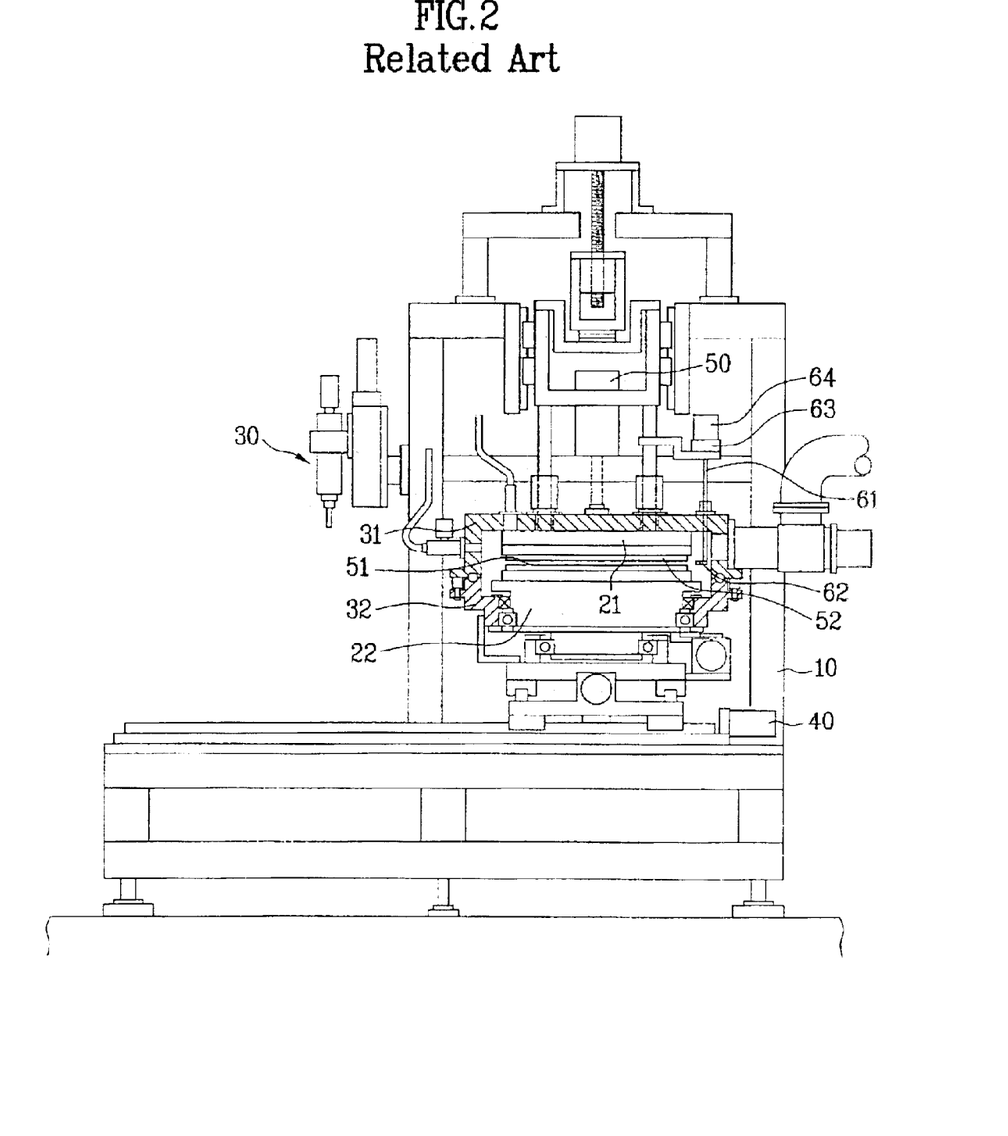
FIG. 2 is a schematic diagram illustrating a substrate assembly device based on a liquid crystal dropping type of the related art at the substrate bonding stage.

FIGS. 1 and 2 show cross sectional views of a substrate assembly device using the liquid crystal dropping method according to the related art. In FIG. 1, the substrate assembly device includes a frame 10, an upper stage 21, a lower stage 22, a sealant dispenser (not shown), a liquid crystal material dispenser 30, a processing chamber including an upper chamber unit 31 and a lower chamber unit 32, a chamber moving system 40, and a stage moving system 50. The chamber moving system 40 includes a driving motor driven to selectively move the lower chamber unit 32 to a location where the bonding process is carried out, or to a location where the outflow of the sealant and dropping of the liquid crystal material occur. The stage moving system 50 includes another driving motor driven to selectively move the upper stage 21 along a vertical direction perpendicular to the upper and lower stages 21 and 22.

The sealant dispenser and the liquid crystal material dispenser 30 are installed at a side of the location where the bonding process is carried out. A vacuum valve 23 and a pipeline 24 as a vacuum source for place the upper chamber unit 31 under vacuum are connected to the upper chamber unit 31. A gas purge valve 25 and a gas tube 26 as a pressure source are also connected to the upper chamber unit 31 for returning the upper chamber unit 31 to the atmospheric pressure state.

The chamber moving system 40 includes a driving motor driven to selectively move the lower chamber unit 32 to a location where the bonding process is carried out, or to a location where the outflow of the sealant occurs and dropping of the liquid crystal material occurs. The stage moving system 50 includes another driving motor driven to selectively move the upper stage 21 along a vertical direction perpendicular to the upper and lower stages 21 and 22.

A process of manufacturing a liquid crystal display device using the substrate assembly device of FIGS. 1 and 2 is explained. First, a second substrate 52 is loaded on the upper stage 21, and a first substrate 51 is loaded upon the lower stage 22. Then, the lower chamber unit 32 having the lower stage 22 is moved to a processing location by the chamber moving system 40 for sealant dispensing and liquid crystal material dispensing. Subsequently, the lower chamber unit 32 is moved to a processing location for substrate bonding by the chamber moving system 40. Thereafter, the upper and lower chamber units 31 and 32 are assembled together by the chamber moving system 40 to form a vacuum tight seal, and pressure in the chamber is reduced by a vacuum generating system.

Then, the upper stage 21 is moved downwardly by the stage moving system 50 at the above-mentioned vacuum state so as to closely contact the second substrate 52 fixed to the upper stage 21 to the first substrate 51 fixed to the lower stage 22. Further, the process of bonding the respective substrates to each other is carried out through a continuous pressurization. Then, gas or air is introduced into the chamber part through the gas purge valve 25 and the gas tube 26 to return the vacuum state of the chamber to the atmospheric state, which presses the bonded substrates.

However, the foregoing related art assembler (bonding machine) has the following problems.

First, when bonding in the bonding chamber, the glass substrates are sometimes broken due to pressure on the glass substrates, or other errors caused by other components in the chamber when pressure is applied to the two substrates using the upper and lower stages for bonding the two substrates. In this instance, an operator is required to remove the broken pieces of glass from the bonding chamber. However removal of fine pieces of glass is not easy. Thus, the fine pieces of glass may remain in the chamber which can interfere with the manufacturing process such as reducing the adhesiveness of the sealant, or deteriorating liquid crystal characteristics.

Second, in addition to the particles from the broken glass substrate, other particles stuck to the substrates are introduced into the chamber when the substrates are loaded and unloaded. Such particles are left in the chamber during the repetitive substrate loading/unloading process which can result defective bonding and poor yield.

SUMMARY OF THE INVENTION

Accordingly, the present invention is directed to a method for cleaning a bonding chamber of a bonding machine that substantially obviates one or more of the problems due to limitations and disadvantages of the related art.

An advantage of the present invention is a method for cleaning a bonding chamber of a bonding machine that can remove fine particles.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of cleaning a bonding chamber of a bonding machine having a vacuum pump and a vent valve includes repeating evacuation of the bonding chamber and venting of the evacuated bonding chamber.

In another aspect of the present invention, a method of cleaning a bonding chamber comprises loading a first substrate and a second substrate in the bonding chamber; bonding the first substrate and the second substrate to produce bonded substrates; unloading the bonded substrates; repeating the loading, the bonding and the unloading for K times, where K is an integer greater than zero; and cleaning the bonding chamber.

In another aspect of the present invention, a method of cleaning a liquid crystal display bonding device having a bonding chamber, a vacuum pump and a vent valve comprises loading first and second substrates into the bonding chamber; evacuating the bonding chamber; bonding the first and second substrates in the bonding chamber; venting the bonding chamber; unloading the first and second substrates; repeating evacuation and venting of the bonding chamber M times, where M is an integer greater than zero; and loading a new set of first and second substrates into the bonding chamber.

In another aspect of the present invention, there is provided a method for cleaning a bonding chamber of a bonding machine including (a) loading a first substrate and a second substrate in the bonding chamber, bonding the first substrate and the second substrate, and unloading the bonded substrates, and (b) repeating step (a) for a preset number of times before the bonding chamber is cleaned. Step (a) preferably includes loading the first and second substrates into the bonding chamber, evacuating the bonding chamber, bonding the first and second substrates, venting the bonding chamber for applying pressure to the bonded substrates, and unloading the bonded first and second substrates. Loading the first and second substrates preferably includes holding the first and second substrates by a lower stage and an upper stage in the bonding chamber, respectively, by vacuum. Evacuating the bonding chamber includes positioning a substrate receiver of the bonding machine to a location below the second substrate held at the upper stage and placing the second substrate on the substrate receiver, holding the first and second substrates at the lower and upper stages, respectively, by an electrostatic charge (ESC), evacuating the bonding chamber, and returning the substrate receiver to an original position.

Repeating step (a) for a preset number of times before the bonding chamber is cleaned includes repeating evacuation and venting of the bonding chamber for a preset number of times. Repeating step (a) for a preset number of times before the bonding chamber is cleaned is preferably carried out before loading the substrate into the bonding chamber. Repeating step (a) for a preset number of times before the bonding chamber is cleaned preferably includes repeating evacuation and venting of the bonding chamber by operating in an alternating fashion vent tubes and air extraction tubes which are coupled to the bonding chamber.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 3:
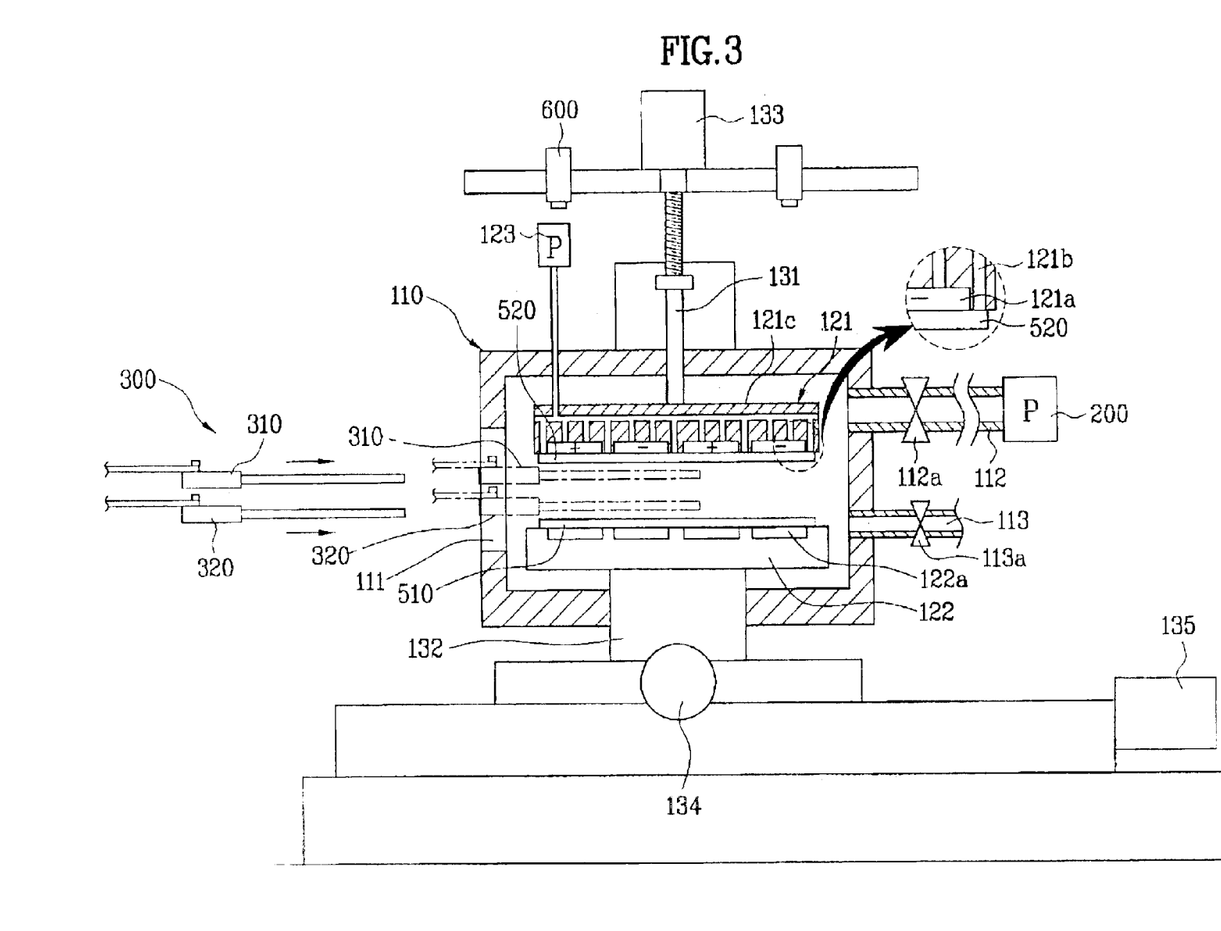
FIG. 3 is a schematic view of a bonding device used in manufacturing an LCD by the liquid crystal dropping method according to the present invention.

FIG. 3 is a simplified schematic diagram illustrating a bonding device for manufacturing an LCD device based on a liquid crystal dropping or applying type in accordance with the present invention.

Referring to FIG. 3, a bonding device of the present invention for manufacturing a liquid crystal display device includes a bonding chamber 110, upper stage 121, lower stage 122, stage moving devices 131 and 132, vacuum device including suction pump 200, pipe 112 and valve 112a, venting device including vent pipe 113 and valve 113a, and a loader 300. The bonding chamber 110 selectively becomes a vacuum state or an atmospheric state to bond substrates by pressurizing them and by using a pressure difference in order. An opening 111 is formed at a predetermined part of the circumference of the bonding chamber 110 for receiving or removing each substrate.

An air discharge pipe 112 and a vent pipe 113 are connected to one side of the bonding chamber 110. The air discharge pipe 112 discharges existing air in the bonding chamber by a suction force from a vacuum device. The vent pipe 113 maintains the inside of the bonding chamber at an atmospheric state by having air or gases ($N_2$) flow into the bonding chamber 110. In this way, the bonding chamber selectively becomes and recovers from the vacuum state. Although only one air discharge pipe 112 and one vent pipe is shown in FIG. 3, a plurality of air discharge pipes 112 and vent pipes may be formed. Valves 112a and 113a electronically controlled for selectively opening and closing the path of the pipes are formed on the air discharge pipe 112 and vent pipe 113, respectively.

Figure 4:
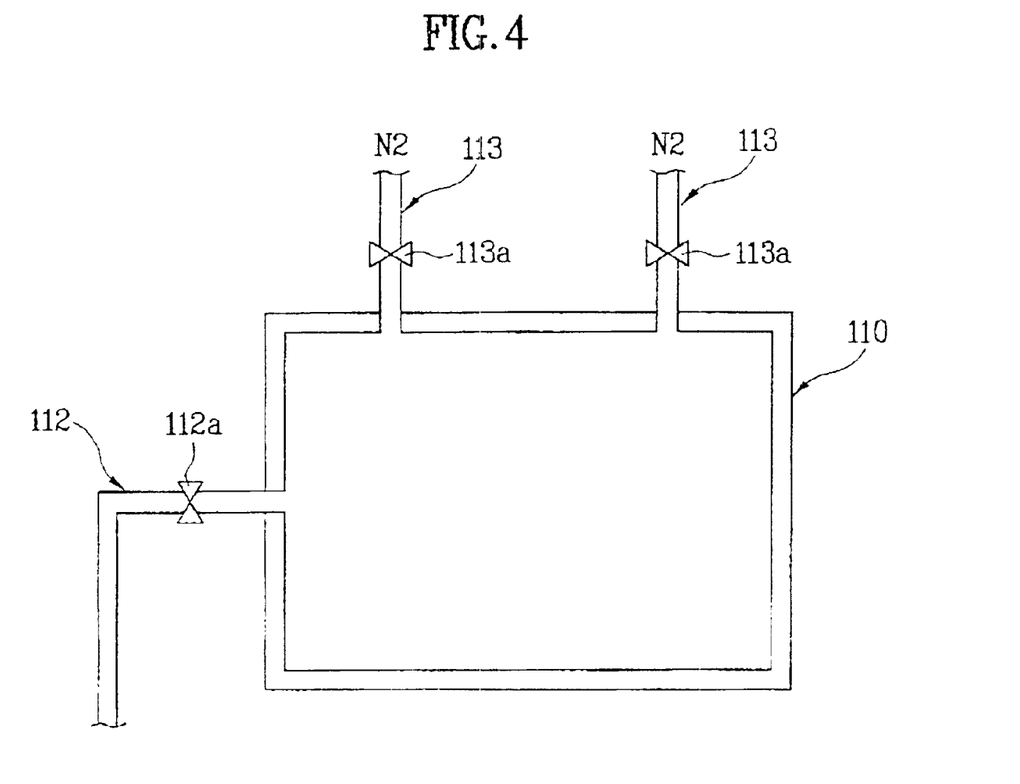
FIG. 4 illustrates vent tubes and extraction tubes of the bonding chamber of the present invention.

Referring to FIG. 4, there are at least two vent pipes or tubes 113 connected to the bonding chamber 110. Even though FIGS. 3 and 4 show one air discharge pipes or extraction tube 112 and one vacuum pump 200, there are preferably four low vacuum pumps and one high vacuum pump designed to be in communication with the air discharge pipe 112 for evacuation of the bonding chamber 110. Preferably, the high vacuum pump is connected to the bonding chamber 110 through one air discharge pipe 112, and two low vacuum pumps are connected to the bonding chamber through one air discharge pipe 112. Accordingly, there are one extraction tube for the one high vacuum pump, and two extraction tubes for the four low vacuum pumps. Therefore, the valves 112a and 113a are fitted to the two vent pipes 112 and three air discharge pipes 113 so that they operate alternately and thus, evacuation and venting can be controlled to repeat as many times as suitably desired.

At an opening 111 of the bonding chamber 110, a door (not shown) is additionally formed to selectively open or close the opening 111. The door may be a sliding door or a revolving door. Other suitable constructions for the door can be used. When the sliding door or the revolving door is used, a sealant for sealing gaps is preferably provided.

Upper and lower stages facing each other are formed respectively on the upper and lower parts inside the bonding chamber 110. The first and second substrates 510 and 520 brought into the bonding chamber by a loader 300 are fixed to the upper and lower stages 121 and 122 and placed in proper positions in the bonding chamber.

On the upper and lower stages 121 and 122, one or more electric static chucks (ESC) 121a and 122a are provided to fix the substrates using an electrostatic force. Also, one or more vacuum holes 121b are formed on the upper and lower stages to hold and bond the substrates using vacuum force.

The electric static chucks 121a and 122a include a plurality of pairs of flat electrodes, to which direct current power having different polarity is provided for an electrostatic bonding of the substrates. Alternatively, one electric static chuck 121a having both polarities can be used to provide the electrostatic force.

The plurality of vacuum holes 121b are formed along the circumference of each of the electric static chucks 121a provided at the bottom of the upper stage 121. The respective vacuum holes 121b communicate with each other through a plurality of paths 121c. A vacuum force is generated by a vacuum pump 123.

On one side of the lower stage 122, one or more electrostatic chucks 122a are provided to hold the substrates onto the stage by electrostatic force and one or more vacuum holes (not shown) are formed to hold the substrates on the stage by vacuum force.

The stage moving system of the present invention includes an upper moving shaft or axis 131, a lower moving shaft or axis 132, and driving motors 133 and 134. The upper moving axis 131 is driven to selectively move the upper stage 121 up and down. The lower moving axis 132 is driven to selectively move the lower stage 122 in a lateral direction. The driving motors 133 and 134 for selectively driving the respective axes extend from outside the bonding chamber to the inside of the bonding chamber and coupled to the respective stages 121 and 122.

A driver 135 moves the lower stage 122 laterally when the substrates are being aligned.

The vacuum device delivers a suction force to place the bonding chamber 110 in a vacuum state. For this reason, the vacuum device has a suction pump 200 which is driven to generate an air suction force. The suction pump 200 is formed to communicate with the air discharge pipe 112 of the bonding chamber 110.

The loader is separately provided outside the bonding chamber 110 unlike other components provided inside the bonding chamber 110. The loader loads and unloads the first substrate 510 on which liquid crystal is applied and the second substrate 520 on which a sealant is applied in and out of the bonding chamber 110.

The loader has a first arm 310 for conveying the first substrate 510 with the liquid crystal and a second arm 320 for conveying the second substrate 520 with the sealant. Before the substrates 510 and 520 on the arms 310 and 320 are transferred to the inside of the bonding chamber 110, the first arm 310 is positioned higher than the second arm 320.

The first arm 310 is positioned higher than the second arm 320 to prevent various kinds of foreign particles from being dropped onto the liquid crystal applied on the first substrate 510. In other words, if the second arm 320 is positioned higher than the first arm 310, various kinds of foreign particles may be dropped onto the liquid crystal of the first substrate 510 as the second arm 320 moves.

The first arm 310 does not necessarily transfer only the first substrate 510 with the liquid crystal and the second arm 320 does not necessarily transfer only the second substrate 520 with the sealant. Preferably, however, the first arm 310 conveys only the substrate with the liquid crystal and the second arm 320 conveys only the substrate with the sealant. Alternatively, if one substrate is provided with both the liquid crystal and the sealant, the first arm 310 may convey this substrate and the second arm 320 may convey the other substrate.

The bonding device of the present invention further includes an alignment device 600 for checking the alignment status of the substrates 510 and 520 brought into the bonding chamber 110 to be loaded onto the stages 121 and 122 by the loader. The alignment device 600 may be provided inside or outside the bonding chamber 110. In explaining the alignment device, however, the alignment device 600 is shown to be outside of the bonding chamber 110.

The substrate bonding process using a bonding system of the present invention will be described below.

A first substrate with a liquid crystal and a second substrate with a sealant are provided. The first substrate may be provided with both the liquid crystal and the sealant. As shown in a dotted line in FIG. 3, a loader 300 has the first substrate 510 on a stand-by position at the upper side using a first arm 310. The loader 300 places the second substrate 520 with its surface with the sealant facing down below the first arm 310 using a second arm 320.

When an opening 111 of the bonding chamber 110 is opened, the loader 300 controls the second arm 320 to load the second substrate 520 inside the bonding chamber 110 through the opening 111 with the sealant facing down. An upper stage 121 is placed on the upper side of the second substrate 520. A vacuum pump 123 coupled to the upper stage 121 delivers a vacuum force to vacuum holes 121b formed on the upper stage 121 so that the upper stage 121 holds and fixes the second substrate 520 brought in by the second arm 320. Then, the upper stage 121 with the second substrate 520 ascends.

The loader controls the first arm 310 so that the first substrate 510 with the liquid crystal is loaded into the bonding chamber 110 and onto the lower stage 122. Similarly to the upper stage 121, a vacuum pump (not shown) connected to the lower stage 122 delivers a vacuum force to vacuum holes (not shown) formed on the lower stage 122 to hold and fix the first substrate 510 brought in by the first arm 310. In this way, the first substrate 510 is attached to the lower stage 122.

The second substrate 520 with the sealant is preferably brought in before the first substrate 510 with the liquid crystal. Otherwise, dust which may be generated while the second substrate 520 is being brought in may be undesirably dropped on the liquid crystal of the first substrate 510.

Since the bonded substrates are already provided on the lower stage from completing the bonding process, the second arm 320 unloads the bonded substrates on the lower stage after bringing in the next second substrate for the next bonding process. In this way, the processes of loading and unloading are performed efficiently, thereby reducing the processing time.

When the loading process of the respective substrates 510 and 520 is completed, the arms 310 and 320 of the loader 300 exit the bonding chamber 110. Also, the door of the opening 111 of the bonding chamber 110 closes to seal the bonding chamber 110, as shown in FIG. 3.

Then, although not shown in FIG. 3, a substrate receiver is placed under the upper stage and the second substrate is placed on the substrate receiver from the upper stage. The bonding chamber then becomes a vacuum state. In other words, a suction pump (vacuum device) 200 is driven to generate a suction force which is delivered into the bonding chamber 110 through valve 112a in the air discharge pipe 112. Therefore, the bonding chamber 110 goes under vacuum.

When the bonding chamber 110 is in the vacuum state, the suction pump 200 stops and the valve 112a operates to keep the air discharge pipe 112 closed. Also, the upper and lower stages 121 and 122 activate their respective electro static chucks 121a and 122a to hold and fix the substrates 510 and 520. Then, the substrate receiver, which temporarily held the second substrate 520, is replaced to its original position.

In this state, a stage moving system drives a driving motor 133 to move the upper stage 121 downward to near the lower stage 122. The alignment device 600 checks the alignment status of the substrates 510 and 520 bonded to the respective stages 122 and 121 and also provides a control signal to moving axes 131 and 132 to align the substrates.

The stage moving device moves the second substrate 520 on the upper stage 121 to the first substrate 510 on the lower stage 520 to bond them together by pressing them. In this way, the first bonding process is performed. The first bonding process in which the substrates are bonded by pressing of the stages 121 and 122 does not necessarily complete the bonding process. In this process, the substrates are preferably bonded such that air cannot flow into the space or interval between the substrates when the bonding chamber returns to the atmospheric state.

When the first bonding process is completed, the valve 113a operates to open the vent pipe 113 so that dry air or $N_2$ gas can flow into the bonding chamber 110. Accordingly, the bonding chamber 110 returns to the atmospheric state and the bonded substrates are pressed together by an atmospheric pressure difference. That is, because the inside of the bonding chamber is at the atmospheric state while the interval between the first and second substrates sealed by the sealant is in the vacuum state, the substrates are pressed to each other by a constant pressure. In this way, the substrates are bonded more completely. After the bonding process, the door at the opening 111 of the bonding chamber 110 is driven to open.

Then, the loader 300 performs the unloading process of the bonded substrates and repeats the above-described processes to bond the next substrates.

A process for bonding substrates by using the foregoing LCD bonding machine of the present invention will be explained with reference to FIG. 5, which is a flowchart showing a method of cleaning the bonding chamber in accordance with a preferred embodiment of the present invention.

Figure 5:
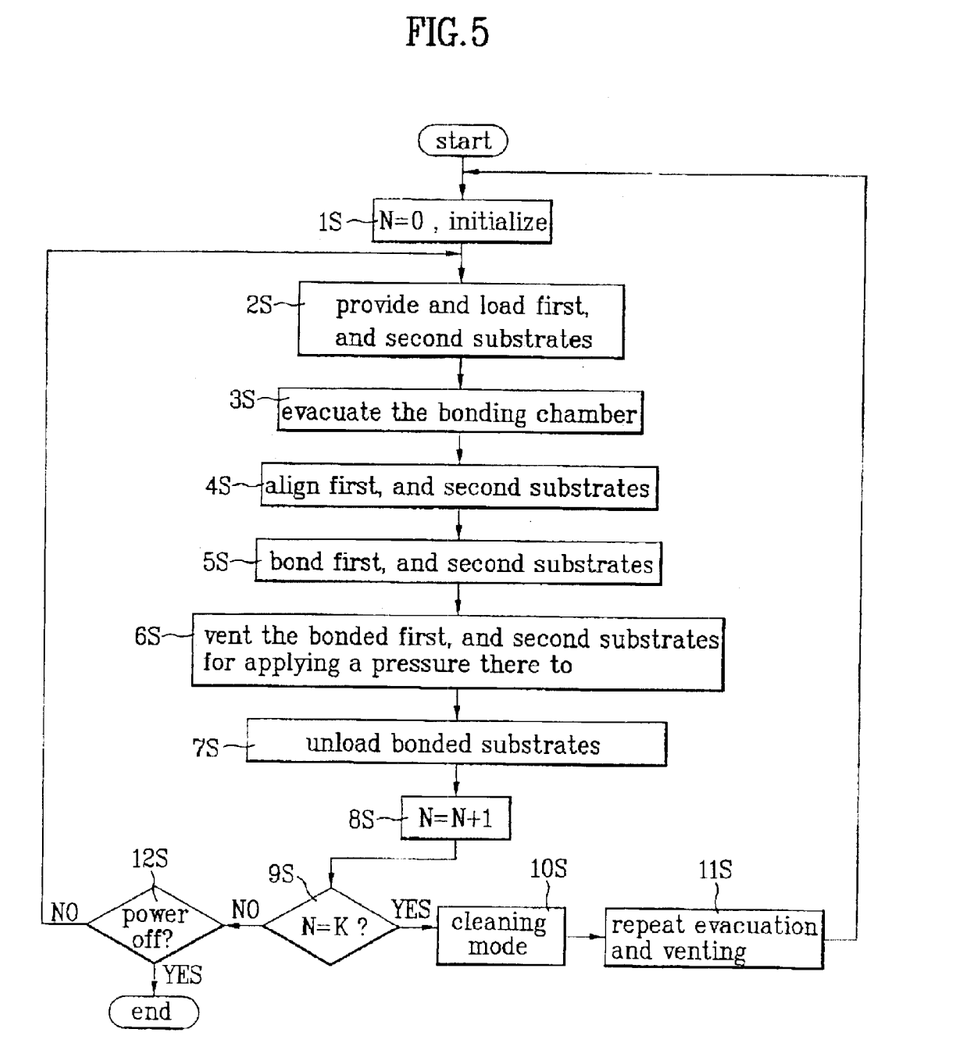
FIG. 5 is a flowchart showing the method for cleaning a bonding chamber in accordance with a preferred embodiment of the present invention.

Referring to FIG. 5, the bonding chamber is initialized (1S) and a count N is set to zero. The count N will be used to trigger the cleaning mode. A first substrate having the liquid crystal applied thereon and a second substrate having a sealant coated thereon are provided. Alternatively, both the liquid crystal and the sealant may be applied and coated on the first substrate, respectively.

Then, as shown in FIG. 3, initially the loader 300 maintains the first substrate 510 on standby at an upper position using a first arm 310, and places the second substrate 520 at a lower position, below the upper position, using the second arm 320.

Under this state, the substrate opening 111 in the chamber 110 is opened. Then, the loader controls the second arm 320 to load the second substrate 520 having the sealant coated thereon into the bonding chamber 110 through the substrate opening 111, moves the upper stage 121 down to the second substrate 520, holds the second substrate 520 onto the upper stage 121 by a vacuum chuck including the vacuum holes 121b in the upper stage 121, and moves the upper stage 121 up. The vacuum chuck operates in conjunction with a vacuum pump 123 connected to the upper stage 121. Accordingly, the second substrate is loaded onto the upper stage 121.

Then, the loader 300 controls the first arm 310 to load the first substrate 510 having the liquid crystal applied thereon into the bonding chamber 110. The first substrate 510 is placed on the lower stage 122, which holds the first substrate 510 by another vacuum chuck having the vacuum holes in the lower stage 122. Thus, the first and second substrates are loaded in the bonding chamber 110 (2S).

The second substrate 520 having the sealant coated thereon is carried into the bonding chamber before the first substrate 510 having the liquid crystal applied thereon. This has the benefit of preventing dust and other undesired particles that may be carried in by the second substrate from falling down onto the liquid crystal applied onto the first substrate 510.

If an already bonded substrate is remaining on the lower stage from a prior bonding process, loading and unloading steps are carried out at the same time to minimize the fabrication time. Here, to save time, after the second arm 320 loads the second substrate onto the upper stage, the second arm 320 then unloads the bonded substrates on the lower stage from the previous bonding process.

Upon completing the loading of the substrates 510 and 520 by the foregoing steps, the arms 310 and 320 in the loader 300 move out of the bonding chamber 110, and the door to the substrate opening 111 in the bonding chamber 110 is closed. The bonding chamber is now in a closed state, as shown in FIG. 3.

Then, the substrate receiver is positioned at a location below the upper stage 121, and the second substrate 520 held by the upper stage using a vacuum chuck is placed down on the substrate receiver, and evacuation of the chamber is started (3S).

By initiating the suction pump (evacuation device) 200 in the evacuation device to generate suction and opening the valve 112a of the air discharge pipe 112, the bonding chamber 110 becomes a vacuum state. In this instance, the vacuum inside of the bonding chamber 110 is preferably at least 0.1 Pa and the rate of evacuation is higher than 1.0 kl/min. That is, the low vacuum pump evacuates at 10 kl/min–30 kl/min, and the high vacuum pump evacuates at 0.1 kl/min–5.0 kl/min.

Thus, when the suction pump 200 is driven for a certain time period to obtain a required vacuum in the bonding chamber 110, the suction pump 200 is stopped, and the air discharge pipe 112 is closed by closing the valve 112a.

When the bonding chamber 110 is evacuated, the upper stage 121 and the lower stage 122 convert from the vacuum chuck to the electrostatic chuck (ESC) 121a and 122a, to hold the respective substrates 520 and 510. Then, the substrate receiver is returned to its original location.

Under this state, the stage moving device activates the driving motor 133 to move the upper stage 121 down toward the lower stage 122, and the alignment device 600 determines the alignment of the substrates 510 and 520 with respect to each other. The alignment device 600 provides control signals to the upper and lower moving shafts 131 and 132 coupled to respective stages 121 and 122, for aligning the substrates (4S).

Then, the stage moving device keeps receiving a driving signal, and is driven continuously, to press the second substrate 520 held by the upper stage 121 down to the first substrate 510 held by the lower stage 122, thereby performing the bonding process (5S).

The bonding performed here is not a complete bonding of the first and second substrates but a bonding only to the extent that no air will enter between the substrates when bonding chamber is changed from the vacuum state to the atmospheric pressure state.

Therefore, when the foregoing bonding process is finished, the valve 113a is opened to introduce dry air or $N_2$ gas into the bonding chamber through the vent tube 113, which causes a pressure difference inside of the bonding chamber 110 to press the bonded substrates together (6S). Since a space between the first and second substrates sealed by the sealant is in a vacuum, and the bonding chamber is at the atmospheric pressure, the first and second substrates are pressed uniformly. If the dry air or $N_2$ introduced into the bonding chamber in the venting is heated, the pressure application is made more effectively. Moreover, heated air or $N_2$ during venting assists in a faster spreading of the liquid crystal.

Eventually, a more perfect pressure is applied to the substrates and when this venting process is finished, the door 114 to the bonding chamber 110 is opened.

Thereafter, the bonded substrate is taken out (7S) by unloading the bonded substrates using the loader 300. The foregoing method is repeatedly performed to bond additional substrates.

However, because of various reasons as discussed above, the inside of the bonding chamber becomes contaminated with fine particles, or with glass broken during the bonding process within the chamber. Therefore, the bonding chamber needs to be cleaned and such cleaning process will be explained (8S–11S).

In order to remove fine particles entering the bonding chamber during loading/unloading of the substrates or by broken glass, the number of repeated substrate bonding process is counted (N=N+1) (8S). When a preset number 'K' of bonding process is reached (9S), a cleaning mode (10S) is triggered. When the cleaning mode is triggered, evacuation of the bonding chamber and venting of the bonding chamber is repeated for a preset number ('Z') of times (11S). In the cleaning mode, the new substrates are not loaded into the chamber.

Here the preset number 'K' is greater than zero but the preset number 'K' can be chosen to be any integer number that is suitable depending on the amount of undesired particles entering the chamber as well as broken glass during the bonding process. For example, if an average operation of the bonding chamber is about 4 hours before cleaning is performed, and if the average time needed to complete the bonding of one pair of substrates is 5 minutes, then 'K' would be 48. This means that for this example, the cleaning mode is triggered after every 48 bonding processes. If there appears to be more particles at any time, 'K' can be reduced to 40, for example, or if in the opposite instance, 'K' can be increased to '60', for example. Depending on this number, the productivity will also be affected to some degree.

In the cleaning mode, the evacuation rate and the vacuum formed by the vacuum pump can be the same as during the bonding process. Moreover, by controlling the operation of the valves on the air discharge pipe and the vent tube in alternating fashion, the number of cycles of vacuum pumping and venting can be chosen as desired and suitable for optimal cleaning. For removal of larger particles in the bonding chamber, a suitable cleaning tool may be used that is known in the industry. That is, the cleaning tool is applied with a cleaning chemical such as isopropyl alcohol (IPA) to wipe and clean the bonding chamber. The repetitive evacuation and venting of the bonding chamber extracts unwanted fine particles in the bonding chamber out of the bonding chamber. In addition, manual cleaning is also contemplated by the present invention, when needed.

As has been explained, the method for cleaning a bonding chamber of a bonding machine has several advantages. The method of the present invention removes unwanted fine particles, which contaminate the bonding chamber during the bonding process by repeating evacuation and venting of the bonding chamber for a preset number of times. Preferably, no substrate is loaded in the bonding chamber at this time and this repetition occurs at fixed intervals during the bonding of the substrates, thereby minimizing defective liquid crystal displays.

It will be apparent to those skilled in the art that various modifications and variations can be made in the method for cleaning a bonding chamber of a bonding machine of the present invention without departing from the spirit or scope of the invention. Thus, it is intended that the present invention cover the modifications and variations of this invention provided they come within the scope of the appended claims and their equivalents.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of cleaning a bonding chamber comprising:
   loading a first substrate and a second substrate in the bonding chamber;
   bonding the first substrate and the second substrate to produce bonded substrates;
   unloading the bonded substrates;
   repeating the loading, the bonding and the unloading for K times, where K is an integer greater than zero; and
   cleaning the bonding chamber.

2. The method according to claim 1, wherein loading the first and second substrates includes holding the first and second substrates to a lower stage and an upper stage in the bonding chamber, respectively.

3. The method according to claim 1, wherein bonding the first and second substrates includes:
   evacuating the bonding chamber,
   bonding the first and second substrates to produce bonded substrates; and
   venting the bonding chamber for applying pressure to the bonded substrates.

4. The method according to claim 3, wherein evacuating the bonding chamber includes:
   positioning a substrate receiver below the second substrate held by the upper stage;
   placing the second substrate on the substrate receiver;
   evacuating the bonding chamber;
   holding the first and second substrates at the lower and upper stages, respectively, using electrostatic charge (ESC); and
   returning the substrate receiver to an original position.

5. The method according to claim 3, wherein cleaning the bonding chamber includes repeating evacuation and venting of the bonding chamber for M times, where M is an integer greater than zero.

6. The method of claim 3, wherein a manual cleaning process is performed when at least one of the first and second substrates is broken inside the bonding chamber and the next step after the manual cleaning process is repeating evacuation and venting of the bonding chamber M times, where M is an integer greater than zero.

7. The method according to claim 3, wherein cleaning the bonding chamber includes repeating evacuation and venting of the bonding chamber by alternating operation of vent pipes and air discharge pipes coupled to the bonding chamber.

8. The method according to claim 1, wherein cleaning the bonding chamber is carried out without loading a next set of first and second substrates into the bonding chamber.

9. The method according to claim 1, wherein K is less than or equal to 40.

10. The method according to claim 1, wherein K is greater than 40.

11. The method according to claim 1, wherein K is less than or equal to 60.

12. The method according to claim 1, wherein K is greater than 60.

13. A method of cleaning a bonding chamber for bonding first and second substrates of a liquid crystal display device comprising:
    loading a first substrate and a second substrate in the bonding chamber;
    bonding the first substrate and the second substrate;
    unloading the bonded substrates; and
    performing a cleaning process after unloading the bonded substrates.

14. The method according to claim 13, wherein loading the first and second substrates includes holding the first and second substrates at a lower stage and an upper stage in the bonding chamber, respectively.

15. The method according to claim 13, wherein bonding the first substrate and second substrates includes;
    evacuating the bonding chamber,
    bonding the first and second substrates, and
    venting the bonding chamber for applying pressure to the bonded substrates.

16. The method according to claim 15, wherein evacuating the bonding chamber includes:
    positioning a substrate receiver below the second substrate held by the upper stage;
    placing the second substrate on the substrate receiver;
    evacuating the bonding chamber;
    holding the first and second substrates at the lower and upper stages, respectively, using electrostatic charge (ESC); and
    returning the substrate receiver to an original position.

17. The method according to claim 13, wherein cleaning the bonding chamber includes repeating evacuation and venting of the bonding chamber for M times, where M is an integer greater than zero.

18. The method according to claim 13, wherein cleaning the bonding chamber includes repeating evacuation and venting of the bonding chamber by alternating operation of vent pipes and air discharge pipes coupled to the bonding chamber.

19. The method according to claim 13, wherein cleaning the bonding chamber is carried out without loading a next set of first and second substrates into the bonding chamber.

20. The method according to claim 13, wherein the cleaning process includes repeating evacuation and venting of the bonding chamber for a preset number of times.

21. The method according to claim 13, wherein the cleaning process includes repeating evacuation and venting of the bonding chamber by alternating operation of vent pipes and air discharge pipes coupled to the bonding chamber.

22. The method according to claim 15, wherein venting the bonding chamber introduces $N_2$ gas into the bonding chamber.

23. The method according to claim 15, wherein the bonding chamber is evacuated at 0.1 kl/min–5.0 kl/min.

24. The method according to claim 13, wherein the cleaning process uses a cleaning jig with a cleaning chemical.

25. The method according to claim 24, wherein the cleaning chemical include isopropyl alcohol (IPA).

26. A method of cleaning a liquid crystal display bonding device having a bonding chamber, a vacuum pump and a vent valve comprising:

loading first and second substrates into the bonding chamber evacuating the bonding chamber;

bonding the first and second substrates in the bonding chamber;

venting the bonding chamber;

unloading the first and second substrates;

repeating evacuation and venting of the bonding chamber M times, where M is an integer greater than zero; and loading a new set of first and second substrates into the bonding chamber.

27. The method of claim 26, wherein the method is stopped and a manual cleaning process is performed when at least one of the first and second substrates is broken inside the bonding chamber.

28. The method of claim 27, wherein the next step after the manual cleaning process is repeating evacuation and venting of the bonding chamber M times, where M is an integer greater than zero.

29. A method of making a liquid crystal displays having first and second substrates comprising:

loading the first and second substrates in a bonding chamber;

bonding the first and second substrates to produce bonded substrates;

unloading the bonded substrates;

repeating the loading, the bonding and the unloading for K times, where K is an integer greater than zero; and cleaning the bonding chamber.

30. A method of making a liquid crystal display having first and second substrates comprising:

loading the first and second substrates in a bonding chamber;

bonding the first and second substrates;

unloading the bonded substrates; and performing a cleaning process after unloading the bonded substrates.

31. A method of making liquid crystal display having first and second substrates using a bonding device having a bonding chamber, a vacuum pump and a vent valve comprising:

loading the first and second substrates into the bonding chamber evacuating the bonding chamber;

bonding the first and second substrates in the bonding chamber;

venting the bonding chamber;

unloading the first and second substrates;

repeating evacuation and venting of the bonding chamber M times, where M is an integer greater than zero; and loading a new set of first and second substrates into the bonding chamber.

* * * * *